United States Patent
Kromenaker et al.

(10) Patent No.: US 6,772,097 B1
(45) Date of Patent: *Aug. 3, 2004

(54) RETRIEVING I/O PROCESSOR PERFORMANCE MONITOR DATA

(75) Inventors: Susan C. Kromenaker, Chandler, AZ (US); Mark L. Brown, Gilbert, AZ (US); Linda M. Roberts, Phoenix, AZ (US); William C. Arthur, Jr., Pheonix, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/408,918

(22) Filed: Sep. 30, 1999

(51) Int. Cl.[7] .............................................. G06F 13/14
(52) U.S. Cl. .................... 702/186; 702/108; 702/117; 702/118; 702/119; 702/122; 702/182
(58) Field of Search ................ 702/108, 117, 702/118, 119, 122, 123, 169, 182, 183, 184, 185, 186, 187, 189, FOR 103, FOR 104, FOR 134, FOR 135, FOR 139, FOR 155, FOR 170, FOR 171; 714/47, 39; 717/4

(56) References Cited

U.S. PATENT DOCUMENTS

| | | | | |
|---|---|---|---|---|
| 5,664,095 A | * | 9/1997 | Cox et al. ............... | 395/184.01 |
| 5,687,376 A | * | 11/1997 | Celi, Jr. et al. ............. | 395/704 |
| 5,913,045 A | * | 6/1999 | Gillespie et al. ............. | 710/311 |
| 5,991,708 A | * | 11/1999 | Levine et al. ................ | 702/186 |
| 6,052,694 A | * | 4/2000 | Bromberg .................... | 707/200 |
| 6,079,032 A | * | 6/2000 | Peri ............................. | 714/38 |
| 6,098,169 A | * | 8/2000 | Ranganathan ............... | 712/227 |
| 6,112,317 A | * | 8/2000 | Berc et al. .................... | 714/47 |
| 6,134,619 A | * | 10/2000 | Futral et al. ................. | 710/112 |
| 6,167,538 A | * | 12/2000 | Neufeld et al. ............... | 714/47 |
| 6,233,531 B1 | * | 5/2001 | Klassen et al. ............... | 702/80 |
| 6,278,959 B1 | * | 8/2001 | Alferness .................... | 702/186 |
| 6,282,173 B1 | * | 8/2001 | Isonuma et al. ............ | 370/242 |
| 6,311,056 B1 | * | 10/2001 | Sandidge .................... | 455/414 |
| 6,321,279 B1 | * | 11/2001 | Bonola ........................ | 710/36 |
| 6,381,656 B1 | * | 4/2002 | Shankman ................... | 710/18 |
| 6,438,684 B1 | * | 8/2002 | Mitchell et al. ............... | 713/1 |
| 2001/0008021 A1 | * | 7/2001 | Ote et al. ..................... | 714/31 |

* cited by examiner

*Primary Examiner*—Marc S. Hoff
*Assistant Examiner*—Carol S W Tsai
(74) *Attorney, Agent, or Firm*—Blakely, Sokoloff, Taylor & Zafman LLP (57) ABSTRACT

An embodiment includes retrieving performance monitor data from an I/O processor. A performance monitoring driver coupled to a performance monitoring unit may be registered as a private driver with a real time operating system of the I/O processor. Events within the I/O processor may be selected on which to gather data. The selected events may be sent as a message request to the real time operating system. The message request may be translated into the appropriate parameters based on a set of private group parameters that may be accessible by the real time operating system. The message request may be sent as a translated request to the performance monitoring unit. The pieces of data requested by the translated request may be returned to the performance monitoring driver. The pieces of data then may be sent to a location specified in the message request.

32 Claims, 4 Drawing Sheets

RETRIEVING I/O PROCESSOR PERFORMANCE MONITOR DATA

BACKGROUND OF THE INVENTION

1. Field of the Invention

The present invention relates to computer system architecture. More specifically, the present invention relates to retrieving performance monitor data from an I/O processor.

2. Background Information

Electronic products may be thought of as those products that involve the controlled conduction of electrons or other charge carriers, especially through microprocessors. Examples of electronic products may include radios, computers, work stations, and servers as well as those involved in high-end networking and storage technology. Just about all electronic products employ one or more microprocessors disposed within a chip located on a printed circuit board. These microprocessors engage a computer operating system as well as applications. The main central processing unit within the chip may include a host system. It may be this host system that runs the computer operating system and the applications.

One type of processor within the host system may be a host processor having a host memory. Another type of processor that may be within the host system may be an input-output (I/O) processor. The I/O processor or I/O Platform (IOP) may be a component of the host system that connects the host system memory to an I/O device to process I/O transactions. The I/O device may be a part of or external to the host system through at least one of a first bus and a second bus. Examples of I/O devices include storage devices such as a small computer systems interface (SCSI) controller for a disk and networking devices such as an Ethernet controller.

One main function of a host system may be to transmit data between the host memory and an I/O device via the I/O processor. Transmitted data may include application data, local area network (LAN) packets, and contents stored on a disk. To accomplish data transmission, data handling and processing units such as a core processor and a local memory may be included within the I/O processor. The core processor and the local memory may be coupled to each other through an internal bus and to a messaging unit and a direct memory access unit through that same internal bus. Ideally, the system performs within established parameters.

To measure and monitor various system parameters that contribute to the overall performance of the I/O processor, a performance monitoring unit may be integrated into the I/O processor. Under current standards, the tasks of the performance monitoring unit may include compiling performance measurements on three buses: the first bus; the second bus; and the internal bus. The measurements of the performance monitoring unit can be used to refine code for improved system level performance. However, these measurements exist in raw, binary data for which no mechanism exists that gathers and compiles this raw, I/O performance monitor data into a form that readily may be usable by a computer programmer or operator.

SUMMARY OF THE INVENTION

An embodiment includes retrieving performance monitor data from an I/O processor. A performance monitoring driver coupled to a performance monitoring unit may be registered as a private driver with a real time operating system of the I/O processor. Events within the I/O processor may be selected on which to gather data. The selected events may be sent as a message request to the real time operating system. The message request may be translated into the appropriate parameters based on a set of private group parameters that may be accessible by the real time operating system. The message request may be sent as a translated request to the performance monitoring unit. The pieces of data requested by the translated request may be returned to the performance monitoring driver. The pieces of data then may be sent to a location specified in the message request.

DETAILED DESCRIPTION OF THE INVENTION

Figure 1:
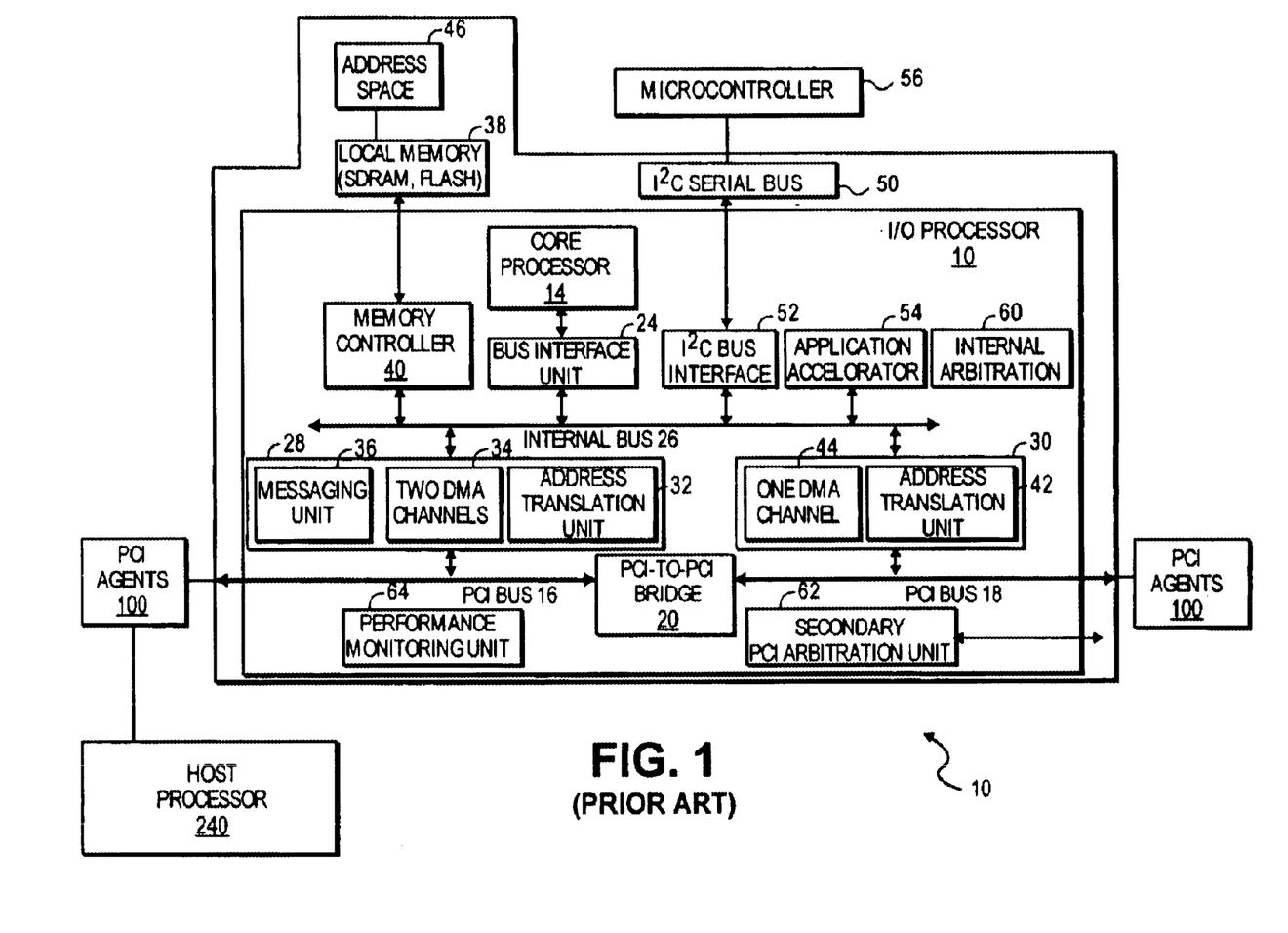
FIG. 1 is a functional block diagram of an I/O processor.

FIG. 1 is a functional block diagram of I/O processor 10. An example of a known processor functional block diagram may be illustrated and described for the Intel® i960® RM/RP Microprocessor as set out in Intel Corporation, *i960® RM/RN I/O Processor Developer's Manual*, pp. 1-1 through 1-12 (1st ed. July 1998). The description regarding FIG. 1 may be based on the Intel® i960® RM/RP Microprocessor.

As show in FIG. 1, I/O processor 10 may integrate core processor 14 into as part of a Peripheral Components Interconnect (PCI) functionality so as to address the needs of intelligent input-output applications ("intelligent I/O" or "I$_2$O" applications). Intelligent I/O applications may be coupled to PCI bus 16 and/or PCI bus 18. Both PCI bus 16 and PCI bus 18 may be industry standard, 64-bit/32-bit, high performance, low latency system buses coupled together by PCI-to-PCI bridge 20. A specification for the PCI bus may be set forth in the document *PCI Local Bus Specification*, revision 2.1, October, 1994. This manual may be prepared and maintained by the PCI Special Interest Group (PCI-SIG). The PCI-SIG may be an organization that may be open for membership to all companies in the computer industry.

Along with providing a connection path between the two independent PCI buses 16 and 18, bridge 20 may provide the ability to overcome PCI electrical loading limits by allowing certain bus transactions on one PCI bus to be forwarded to the other PCI bus. Core processor 14 may be indirectly connected to PCI-to-PCI bridge 20. Bus interface unit 24 may couple core processor 14 to internal bus 26. In turn, internal bus 26 may be coupled to transfer group 28 and transfer group 30. Internal bus 26 may be a 64-bit bus. PCI-to-PCI bridge 20 may be coupled to transfer group 28 through PCI bus 16 and may be coupled to transfer group 30 through PCI bus 18, each path of which may provide a link to core processor 14. By communicatively connecting core processor 14 to bridge 20, core processor 14 may provide processor "intelligence" to bridge 20 to better address the needs of intelligent I/O applications coupled to PCI bus 16 and/or PCI bus 18.

PCI agents 100 may be coupled to either PCI bus 16 or PCI bus 18 so as to interact with one of the transfer groups, 28 and 30. PCI agents 100 may include external PCI devices or a host processor, such as host processor 240. Within PCI agent 100 may be PCI memory having PCI address spaces.

Internal bus 26 may be coupled to local memory 38 through memory controller 40. Local memory 38 may include memory systems external to I/O processor 10 that do not require external logic. Examples of local memory 38 may include Synchronous Dynamic Random Access Memory (SDRAM), Read-Only Memory (ROM), and Flash memory.

Transfer group 28 may be composed of Address Translation Unit 32, two Direct Memory Access channels 34, and messaging unit 36. Transfer group 30 may be composed of Address Translation Unit 42 and One DMA channel 44.

Address Translation Unit (ATU) 32 may allow transactions between the PCI address space within PCI agent (or "agents") 100 and address space 46 within local memory 38. Address translation may be controlled through programmable registers (not shown) that may be accessible from both PCI agent 100 and core processor 14. ATU 42 may function similarly to ATU 32, but may work in conjunction with PCI bus 18 for PCI agents 100 coupled to PCI bus 18. Dual access to registers through ATU 32 and ATU 42 may allow flexibility in mapping the coupled address spaces.

To provide low latency and high throughput data transfers between PCI agents 100 and local memory 38, three separate DMA channels may be provided as shown in FIG. 1. Two Direct Memory Access (DMA) channels 34 may be included with transfer group 28 and one DMA channel 44 may be included with transfer group 30. The three DMA channels may operate as a DMA controller to support chaining and unaligned data transfers. This DMA controller may be programmable through core processor 14.

The I$_2$O Architecture Specification describes an open architecture for developing device drivers in a system environment. Conventionally, based on the I$_2$O Architecture Specification, messaging unit (MU) 36 provides data transfer between PCI agents 100 coupled to PCI bus 16 and core processor 14. MU 36 can be used to send and receive messages. Moreover, MU 36 may interrupt PCI bus agents 100 or core processor 14 when new data arrives and passes the data as directed.

Core processor 14 may be interfaced with internal bus 26 through bus interface unit 24. Local memory 38 may be coupled to internal bus 26 through memory controller unit 40. Microcontrollers 56 may be interfaced with internal bus 26 through the series of Inter-Integrated Circuit (I$^2$C) serial bus 50 and I$^2$C bus interface unit 52. Both local memory 38 and microcontrollers 56 may be external to I/O processor 10. Application accelerator unit 54 may be also coupled to internal bus 26.

Memory controller 40 may allow direct control of local memory 38. Core processor 14 may operate out of local memory 38 where this memory space may be independent of PCI agents 100. Bus interface unit (BIU) 24 may forward accesses to core processor 14 to internal bus 26 without translation. Microcontrollers 56 may perform management functions for the systems of I/O processor 10. Application accelerator unit (AAU) 54 may execute data transfers to and from local memory 38 on behalf of core processor 14 as set out for the I$_2$O standard.

I/O processor 10 may further include internal arbitration unit 60 to serve as arbiter for the systems of internal bus 26, PCI arbitration unit 62 to serve as arbiter for the PCI bus 18, and performance monitoring unit (PMON) 64.

As noted above, performance monitoring unit (PMON) 64 may be used to compile performance measurements on the three buses: PCI bus 16, PCI bus 18, and internal bus 26. The compiled measurements of PMON 64 can be used for performance analysis or real-time system tuning by refining code for improved system level performance.

Within the I$_2$O Architecture, data may be stored in parameter groups on I/O processor 10 such as in local memory 38. Data in local memory 38 may be modified or extracted by host processor 240 through a message sent by host processor 240 to I/O processor 10. However, the I$_2$O Architecture does not provide any mechanism for gathering performance measurements compiled by PMON 64. The below embodiments of the invention extend the I$_2$O Architecture to provide this capability.

Figure 2:
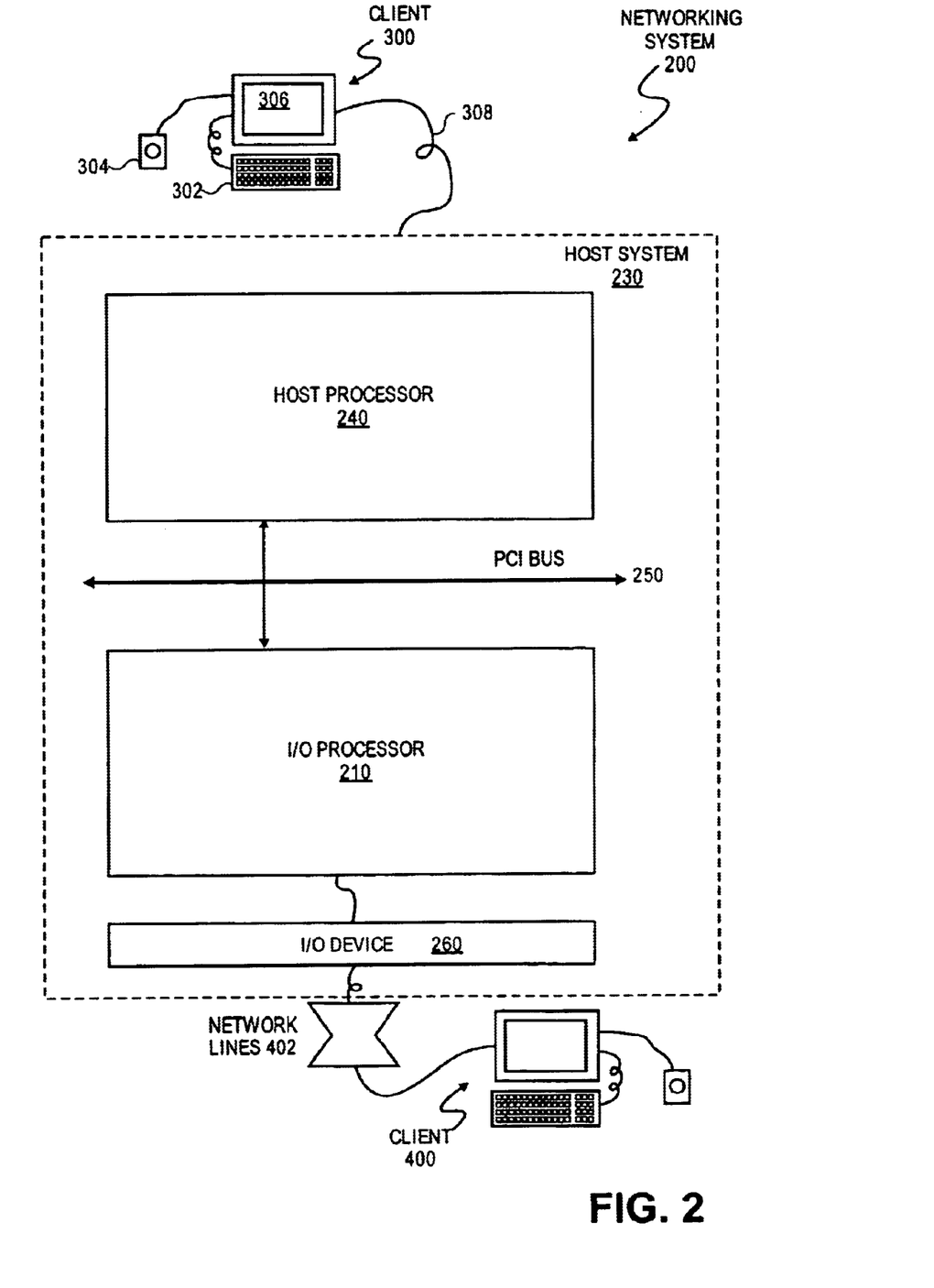
FIG. 2 is a block diagram of a networking system 200.

FIG. 2 is a block diagram of networking system 200. Networking system 200 may include client 300 coupled to client 400 through host system 230. Host system 230 may include host processor 240 coupled to I/O processor 210 through host system or PCI bus 250. Within host system 230 may be I/O device 260 interfaced with I/O processor (IOP) 210. Network lines 402 may be coupled to I/O device 260.

Client 300 may be a computer that may include data input devices such as keyboard 302 and mouse 304 and may include visual monitor 306. Preferably, host system 230 physically may be part of client 300, but may be remote from client 300. For example, client 300 may be in one location and host system 230 may be in another location, but connected via communication channels 308, where channels 309 may include radio signals, cabling, or the Internet.

As one example of networking system 200, host system 230 may be connected to client 400 through network lines 402. Network lines 402 may be any form of communication channel over which data from host system 230 may be transmitted to client 400. Client 400 may be composed of one computer or millions of computers.

Figure 3:
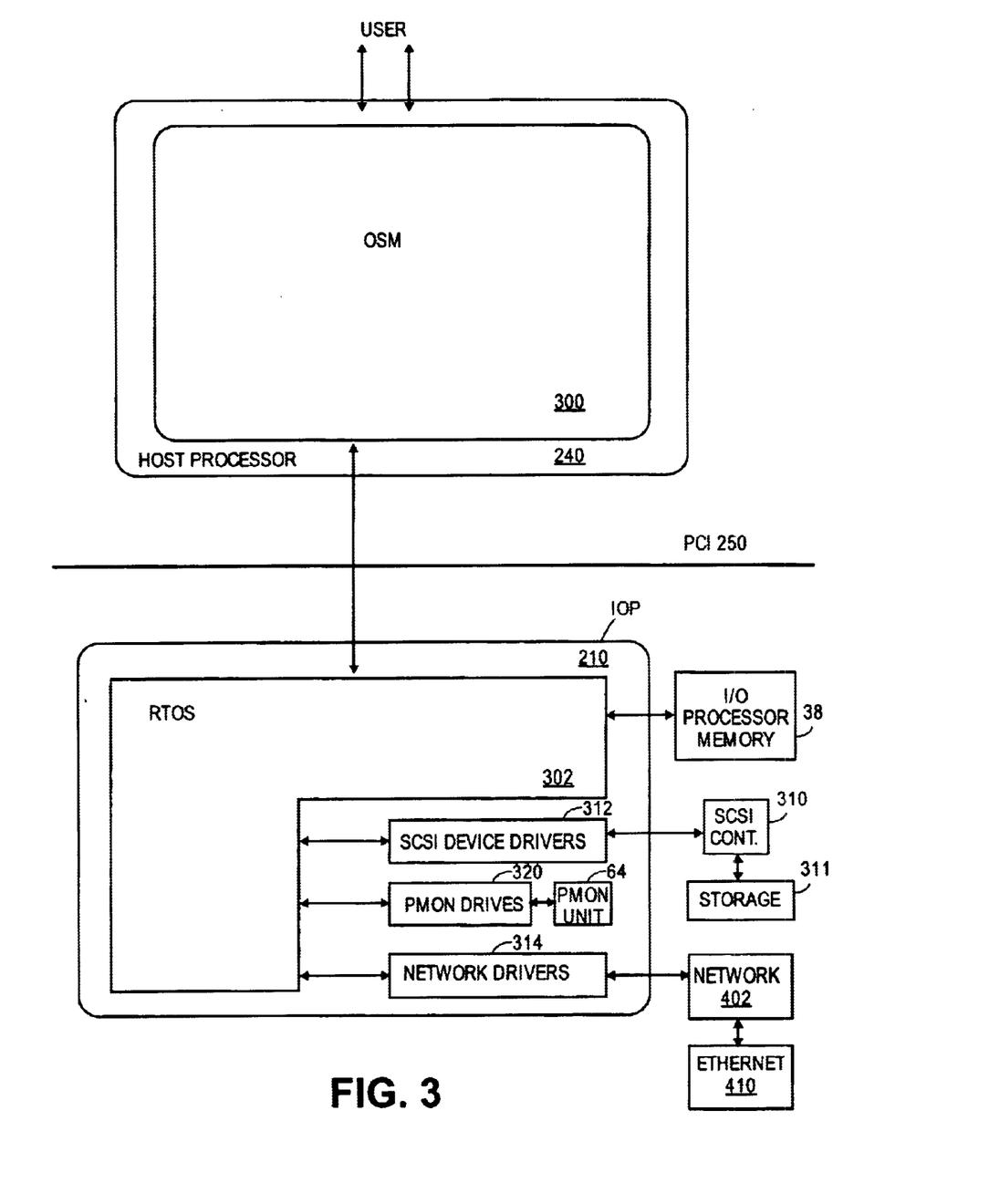
FIG. 3 illustrates a more detailed view of a host processor and an I/O processor.

FIG. 3 illustrates a more detailed view of host processor 240 and I/O processor 210. Within host processor 240 may be an Operating System Specific Module (OSM) 300. Preferably, OSM 300 may be the host process software for the I$_2$O architecture. OSM 300 may be coupled to Real Time Operating System (RTOS) 302. The software of RTOS 302 may abstract a large portion of I/O processor 210 hardware from the rest of the software that runs on I/O processor 210. By permitting common commands to enable applications within I/O processor 210, RTOS 302 may permit a programmer to develop a driver for one I/O device and get the driver running on one or many different I/O processors with minimal effort.

Conventionally, drivers may be used to couple devices external to I/O processor 210. As shown in FIG. 3, Small Computer System interface (SCSI) device driver 312 may couple SCSI controller 310 to RTOS 302 as an example of a storage device. Network lines 402, as coupled to Ethernet 410, may be coupled to RTOS 302 through networking network driver 314 as an example of a networked device.

RTOS 302 may aid in message passing between the external devices and OSM 300. By conceptually treating PMON unit 64 as a device external to I/O processor 210, the invention takes advantage of the message passing features of RTOS 302 by coupling PMON unit 64 to RTOS 302 through PMON driver 320. PMON driver 320 may be a Device Driver Module (DDM) dedicated to performance (perf) monitoring resources and may be referred to as "perfDDM". PMON driver 320 may operate by itself or work in conjunction with either a storage device or a networking device.

The system management interface of the I$_2$O Architecture Specification provides for developing private parameter groups. Private parameter groups may reside in the I/O processor memory. An Operating System Specific Module may be used to gather data from a driver. For example, private parameter groups of the invention may reside in the I/O processor memory and OSM 300 may be used to gather data from PMON driver 320 of FIG. 3.

Each parameter group may include a group number, a group type, a group name, a description of the group, and may include one or more parameters belonging to the group. A parameter may be identified by a field number, whether the parameter may be readable or writable, the file size of the parameter, the parameter name, and a description of the parameter. In one embodiment of the invention, three private parameter groups containing a total of thirty one fields reside as software in memory 38 of I/O processor 210.

Within performance monitoring Table 1, Table 2, and Table 3 below may be a set of parameter groups that define an embodiment of the invention. Table 1 may be the Control Group, Table 2 may be the Mode Control Group and Table 3 may be the Mode Data Group. The contents of the parameter groups may include the performance monitor data and performance monitor setup information. Software running on host processor 240 may be able to gather or modify one or more parameters stored in these parameter groups.

TABLE 1

Performance Monitoring Control Group 0x8000x

| Group Number | 0x8000x |
|---|---|
| Group Type | SCALAR |
| Name | PERFORM_CONTROL |
| Description | A table of all control parameters for hardware-based performance monitoring resources |

| Field Idx | (r/w) | Field Size | Parameter Name | Description |
|---|---|---|---|---|
| 0 | r/w | 5 Bytes | LockControl | Bytes 0–3 may be the AuthenticationKey. When the LockControl field is read by an application and the Locked bit is not set, the initiator Target Identification (TID) from the UtilGetParams message may be saved, a unique AuthenticationKey may be returned in these bytes of the field, and the Locked bit may be tentatively changed to the set state. The application then has 2 seconds to lock the performance monitoring resources by sending a UtilParamsSet message with the proper TID to write to the LockControl field with the Locked bit set and the proper AuthenticationKey in Bytes 0–3. When this occurs, the resources remain locked, if they are currently unlocked. Otherwise, after the 2 second timeout period runs out, the locked bit may be reset and other applications can attempt to lock the resources. During the 2 second backoff period, other applications that read the LockedControl field will detect that the resources are already locked, and the AuthenticationKey will be set to something other than the proper one. |
| 1 | r/w | 11 Bytes | Control | Bit 0 of byte 4 may be the Locked bit. For the Locked bit, 1 means locked and 0 means unlocked. When this bit is set along with a proper AuthenticationKey, the perfDDM saves the initiator TID, fields from the UtilParamsSet message. Every subsequent UtilParamsSet or UtilParamsGet message with an initiator TID field equal to the saved TID value causes a watchdog timer to be zeroed. After 5 min., if no UtilParamsGet or UtilParamsSet messages to the perfDDM parameter groups with the initiator TID field equal to the saved value are received, then the locked state bit may be cleared. |

TABLE 1-continued

Performance Monitoring Control Group 0x8000x

| | | | 0x8000x |
|---|---|---|---|
| Group Number | | | SCALAR |
| Group Type | | | PERFORM_CONTROL |
| Name | | | A table of all control parameters for hardware-based |
| Description | | | performance monitoring resources |

| Field ldx | Field (r/w) | Field Size | Parameter Name | Description |
|---|---|---|---|---|
| | | | | This mechanism mediates resource contention between applications and DDMs under development, while preventing resource lockout due to halted applications. Default may be unlocked(0). NOTE: Because of the 2 second timeout condition, spurious UtilGetParams messages that read the LockControl field should be avoided, since these reads would prevent other applications from being able to lock the performance monitoring resources during the backoff period. Bytes 0–3 contain the AuthenticationKey. The AuthenticationKey verifies that the configuration host application that may be attempting alteration is the one that locked the resources. On writes, this key must be equal to the last authentication key issued by the perfDDM. If equal, the host application's UtilParamsSet message will be processed normally. If not equal to the last issued authentication key, then the UtilSetParams reply message indicates an error. On reads this field returns 0. Bit 0 of byte 4 may be the Accumulate count bit. For the Accumulate count bit, 0 means only report deltas for last interval and 1 means accumulate counters and time intervals. Default may be Accumulate counters and time intervals(1). Bit 1 of byte 4 may be the Counting_On bit. The Counting_On bit gives the application a quick way to turn off counting in the performance monitor. This will be used to limit the impact of performance monitoring-related bus accesses on the counter statistics reported. When an application wants to turn counting off, it will send the smallest UtilParamsSet message possible to access only this field. When counting is turned ON, the saved counter values for each mode may be zeroed out. Default may be counting off. Note: when Counting_On is 1, all writes to any other parameter group fields or bits than Counting_ON may be disallowed. An error will be returned for such accesses. Note: when Counting_On is 0 and |

TABLE 1-continued

Performance Monitoring Control Group 0x8000x

| | | | 0x8000x |
|---|---|---|---|
| Group Number | | | SCALAR |
| Group Type | | | PERFORM_CONTROL |
| Name | | | A table of all control parameters for hardware-based |
| Description | | | performance monitoring resources |

| Field Idx | Field (r/w) | Field Size | Parameter Name | Description |
|---|---|---|---|---|
| | | | | all the ModelInterval fields for all modes may be set to 0 (see group 0x8001, field #1 below), counting cannot be turned on, since no modes have been allocated counting intervals. Attempts to set Counting_On in this case will result in an 120_PARAMS_STATUS_SCALAR_ERROR being returned by the operation. Bit 2 of byte 4 may be the GlobalSendOnCycleEnd bit. If bit 2 is set, the EventData fields of Event Acknowledge Messages for the CYCLE_END event will contain selected rows of the PERFMON_MODE_DATA table group. If this bit is reset, Event Acknowledge messages contain no EventData. Default may be reset. Bit 3 of byte 4 may be the Pause bit. The Pause bit can be used to temporarily disable counting and subsequently reenable counting without zeroing the saved counter values for each mode. Default may be OFF. Byte 5 may be the CurrAlgorithm The CurrAlgorithm may be used to set the sampling algorithm. Initially, there will be two sampling algorithms supported: User-configurable simple round-robin(0), and distributed round-robin(1). Default: distributed round-robin. Bit 2 of byte 4 may be the GlobalSendOnCycleEnd bit. If bit 2 is set, the EventData fields of Event Acknowledge Messages for the CYCLE_END event will contain selected rows of the PERFMON_MODE_DATA table group. If this bit may be reset, Event Acknowledge messages contain no EventData. Default may be reset. Bit 3 of byte 4 may be the Pause bit. The Pause bit can be used to temporarily disable counting and subsequently reenable counting without zeroing the saved counter values for each mode. Default may be OFF. Byte 5 may be the CurrAlgorithm The CurrAlgorithm may be used to set the sampling algorithm. Initially, there will be two sampling algorithms supported: User-configurable simple round- |

TABLE 1-continued

Performance Monitoring Control Group 0x8000x

| Group Number | | | | 0x8000x |
|---|---|---|---|---|
| Group Type Name | | | | SCALAR PERFORM_CONTROL |
| Description | | | | A table of all control parameters for hardware-based performance monitoring resources |

| Field Idx | Field (r/w) | Field Size | Parameter Name | Description |
|---|---|---|---|---|
| | | | | robin(0), and distributed round-robin(1). Default: distributed round-robin. Byte 6 may be the SampleUnits. The SampleUnits specifies the units for the selected sample interval: usec(0), msec(1), sec(2), min(3). Default: msec. Bytes 7 through 10 may be the SampleInterval; which specifies the number of SampleUnits in the selected sample interval. Default: 100, giving a default sample interval of 100 msec. If the users select as a sample interval less than the minimum sample interval, the actual sample interval may be rounded up. The largest sample interval supported may be 71 minutes. |
| 2 | r | 1 Byte | MaxMode | Maximum # of modes for the performance monitoring resources. DDMs use this to indicate the number of modes supported by the underlying hardware. Typically these may be hardware modes. |
| 3 | r | 1 Byte | CurrentMode | Current mode of the performance monitoring resources. This may be used for debugging purposes. |
| 4 | r | 1 Byte | MaxAlgorithm | Maximum # of sample algorithms. DDMs can use this to indicate the number of algorithms that can be supported. Sample algorithms may be software-controlled. |
| 5 | r | 1 Byte | MinSampleUnits | Specifies the units for the minimum supported sample interval: usec(0), msec(1), sec(2), min(3). This value will be determined by the resolution of the RTOS event timer. |
| 6 | r | 4 Bytes | MinSampleInterval Interval | Number of MinSampleUnits in the minimum supported sample interval. This value will be determined by the resolution of the RTOS system timer rounded to the nearest microsecond. |
| 7 | r | 1 Byte | PerfHWType | Type of performance monitoring hardware available: ~0 means NONE, 1 means i960 RN or RM, all other values may be reserved. |
| 11 | r | 1 Byte | NumCounters | Number of performance monitor counters supported by hardware. |
| 13 | r | 1 Byte | SampleInterval Status | Provides an indicator of whether the user-selected sample interval may be okay(0), too small(1), or too large(2), adjusted(3). |
| 14 | r | 4 Bytes | AdjustedSample Interval | Displays the rounded up sample interval, e.g. the user-configured sample interval rounded up to the next integer multiple of the system timer resolution. |

TABLE 2

Performance Monitoring Mode Control Group 0x8001

| Group Number | | | 0x8001 | |
|---|---|---|---|---|
| Group Type | | | Table | |
| Name | | | PERFMON_MODE_CONTROL | |
| Description | | | A table of mode-specific control parameters for the performance monitoring resources. | |

| Field ldx | (r/w) | Field Size | Parameter Name | Description |
|---|---|---|---|---|
| 0 | r | 1 Byte | Mode | Performance monitoring mode to be controlled, 1–7. |
| 1 | r/w | 8 Bytes | ModeControl | Bytes 0–3 contain the AuthenticationKey. The AuthenticationKey may be used to verify that the host application attempting to alter the configuration is the one that locked the resources. On writes, this key must be equal to the last authentication key issued by the perfDDM. If equal, the host application's UtilParamsSet message will be processed normally. If not equal to the last issued authentication key, then the UtilSetParams reply message indicates an error. On reads, bytes 3–7 return 0. Bytes 4–7 of this field contain the ModeIntervals. The ModeIntervals represents the number of selected sample intervals dedicated to a particular mode when using the simple round-robin; writes to this sub-field cause all modes counter values to be zeroed, if not already done. A flag, counts_zeroed, in perfDDM will track this; it may be set when the first Mode Time is zeroed, and reset when counting is turned on. This will reduce the impact on the overall system that would occur if the Mode Times for more than one mode were altered. This defaults to 10 times the sampling interval. |

TABLE 3

Performance Monitoring Mode Data Group 0x8002

| Group Number | | | 0x8002 | |
|---|---|---|---|---|
| Group Type | | | Table | |
| Name | | | PERFMON_MODE_DATA | |
| Description | | | A table of data parameters for all counters in each mode. Each row pertains to an individual mode. | |

| Field ldx | (r/w) | Field Size | Parameter Name | Description |
|---|---|---|---|---|
| 0 | r | 1 Byte | Mode | Performance monitoring mode for the data, 1–7. |
| 1 | r | 8 Bytes | CurrTime | Current accumulated value of GTSR register plus rollover bits. This value accumulates over multiple sample intervals until the end of the time slice may be reached. This may be updated whenever an interval ends, if the host application disables counting in the middle of an interval, or if the host application requests the data in the middle of an interval. Main use of this may be to determine how stale or current the data may be when very long interval times may be being used. Units may be the period of the GTSR clock. |
| 2 | r | 8 Bytes | SigmaTime | Accumulated time for this mode at end of last completed interval. Units may be the period of the GTSR clock. |
| 3 | r | 8 Bytes | EndingTime | Value of GTSR plus rollover bits at the end of the last completed interval. This may be compared to CurrTime to determine the relative currency of the counter data. |
| 4 | r | 8 Bytes | Counter01 | PEC01 counter value at end of last completed interval. |
| 5 | r | 8 Bytes | Counter02 | PEC02 counter value at end of last completed interval. |
| 6 | r | 8 Bytes | Counter03 | PEC03 counter value at end of last completed interval. |
| 7 | r | 8 Bytes | Counter04 | PEC04 counter value at end of last completed interval. |
| 8 | r | 8 Bytes | Counter05 | PEC05 counter value at end of last completed interval. |
| 9 | r | 8 Bytes | Counter06 | PEC06 counter value at end of last completed interval. |
| 10 | r | 8 Bytes | Counter07 | PEC07 counter value at end of last completed interval. |
| 11 | r | 8 Bytes | Counter08 | PEC08 counter value at end of last completed interval. |
| 12 | r | 8 Bytes | Counter09 | PEC09 counter value at end of last completed interval. |
| 13 | r | 8 Bytes | Counter10 | PEC10 counter value at end of last completed interval. |
| 14 | r | 8 Bytes | Counter11 | PEC11 counter value at end of last completed interval. |
| 15 | r | 8 Bytes | Counter12 | PEC12 counter value at end of last completed interval. |
| 16 | r | 8 Bytes | Counter13 | PEC13 counter value at end of last completed interval. |
| 17 | r | 8 Bytes | Counter14 | PEC14 counter value at end of last completed interval. |

Figure 4:
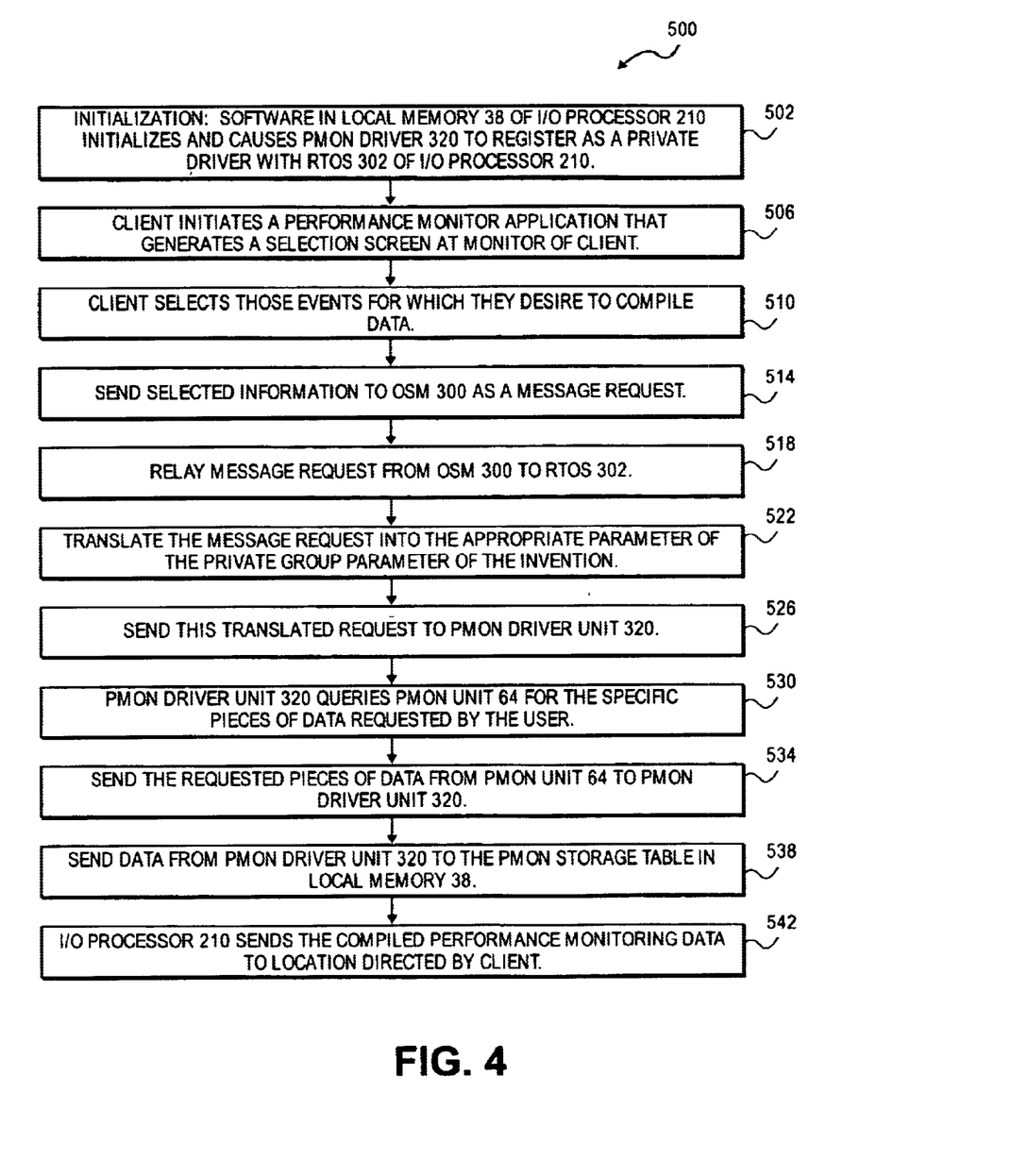
FIG. 4 is a flow diagram of a method of operation 500 of the invention.

FIG. 4 is a flow diagram of a method of operation 500 of the invention. Method 500 may be implemented in a computer readable storage medium containing executable computer program instructions which when executed cause the networking system to perform method 500. Also, method 500 may be implemented in a distributed readable storage medium containing executable computer program instructions which when executed cause an I/O processor to perform method 500.

At initialization 502 of method 500, the software in local memory 38 of I/O processor 210 may initialize. This may create a performance monitoring (PMON) storage table in local memory 38. The PMON storage table may be able to store and keep separate the various pieces of information retrieved from PMON unit 64 and placed in that table. Additionally, initializing the software in local memory 38 also may cause PMON driver 320 to register as a private driver with RTOS 302 of I/O processor 210 since PMON driver 320 may not be a networking type driver or a storage type driver.

In operation, a user of client 300 or client 400 of FIG. 2 may initiate a performance monitor application at step 506 that may generate a selection screen at visual monitor 306. The selection screen may allow the user to select those events on PCI bus 16, PCI bus 18, or internal bus 26 for which the user desires to compile data. The user may also specify the time periods that the user desires to see the compiled data at visual monitor 306. In regards to the events on PCI bus 16, PCI bus 18, or internal bus 26, the $I_2O$ Architecture divides monitorable events into occurrence events and duration events. Occurrence events may be counted each time the event occurs. For a duration event, a counter may count the number of clocks during which a particular condition or set of conditions may be true. A total of ninety-eight events may be monitored, subject to the availability of event counters.

At step 510, the user may select at visual monitor 306 those events on PCI bus 16, PCI bus 18, or internal bus 26 for which the user desires to compile data by entering their selection in the selection screen. After selecting those events the user desired monitored, the information entered into the selection screen at visual monitor 306 may be sent at step 514 to OSM 300 of host processor 240 as a message request. This message request may specify specific pieces of data from PMON unit 64. OSM 300 may relay this message request to RTOS 302 at step 518 without an understanding of whether the message request is for a networking type driver, a storage type driver, or a private driver. However, RTOS 302 may recognize this message request as a request for the PMON driver 320, previously registered as a private driver with RTOS 302.

Using the fields of the three private parameter groups residing in local memory 38 of I/O processor 210, RTOS 302 may translate the message request at step 522 into the appropriate parameter of the private group parameters of the invention. Parameters of the private group parameters may be set out in Table 1, Table 2, and Table 3 above.

At step 526, RTOS 302 send this translated request to PMON driver 320. In response to receiving the translated request, PMON driver 320 may query PMON unit 64 at step 530 for the specific pieces of data requested by the user. The query to PMON unit 64 may result in the requested pieces of data being sent to PMON driver 320 at step 534. PMON driver 320, in turn, may send this data to the PMON storage table in local memory 38 at step 538 where the data may be compiled and stored for dispatch to the user at the time periods specified by the user at visual monitor 306 in the selection screen. The data may be saved in such a way that another application may be written that would take this data and present it to client 300, for example, in a meaningful fashion.

At the time periods specified by the user in the selection screen, I/O processor 210 may send the compiled performance monitoring data back to the user through RTOS 302 and OSM 300 at step 542. The compiled performance monitoring data may also be directed to other locations within networking system 200 for purposes such as to cause an effect. For example, the data may be sent to an interpreting device that determines whether the server of host system 230 is too hot based on the compiled performance monitoring data. If so, the interpreting device may generate a message that causes an internal fan to turn on.

The exemplary embodiments described herein are provided merely to illustrate the principles of the invention and should not be construed as limiting the scope of the subject matter of the terms of the claimed invention. The principles of the invention may be applied toward a wide range of systems to achieve the advantages described herein and to achieve other advantages or to satisfy other objectives, as well.

What is claimed is:

1. A method comprising:
   registering a performance monitoring driver with a real time operating system (RTOS) of an input/output (I/O) processor, wherein the performance monitoring driver is coupled to a performance monitoring unit (PMU);
   selecting events within the I/O processor to gather data on;
   sending the selected events as a message request from a host processor to the RTOS of the I/O processor; and
   translating the message request into parameters that are accessible by the RTOS.

2. The method of claim 1, further comprising:
   sending the message request as a translated request to the PMU.

3. The method of claim 1, further comprising:
   initiating a performance monitor application that generates a selection screen on a display coupled to the I/O processor through the host processor,
   wherein selecting events within the I/O processor on which to gather data includes selecting the events on the selection screen.

4. The method of claim 1, wherein sending the selected events as a message request to the real time operating system includes sending the message request through an operating system specific module of the host processor.

5. The method of claim 1, wherein sending the translated request to the performance monitoring unit includes sending the translated request through the performance monitoring driver.

6. The method of claim 1, wherein the parameters includes at least one of (i) control parameters for hardware-based performance monitoring resources, (ii) mode-specific control parameters for a performance monitoring resource, and (iii) data parameters for at least one mode in one counter.

7. The method of claim 6, wherein the parameters includes at least one of the following parameters: an adjusted sample, a control, a counter, a current mode, a current time, an ending time, an interval, a lock control, a maximum algorithm, a maximum mode, a minimum sample interval, a minimum sample unit, a mode control, a number counter, type of performance monitoring hardware available, a sample interval, a sigma time, and a status.

8. The method of claim 1, further comprising:
   generating performance monitoring storage tables within a memory of the I/O processor.

9. A machine readable medium having instructions stored thereon that when executed by a processor cause a system to:
   register a performance monitoring driver as a private driver with a real time operating system (RTOS) of an input/output (I/O) processor, wherein the performance monitoring driver is coupled to a performance monitoring unit (PMU);
   select events within the I/O processor to gather data on;
   send the selected events as a message request from a host processor to the RTOS of the I/O processor; and
   translate the message request into parameters based on a set of private group parameters that are accessible by the RTOS.

10. The machine readable medium of claim 9, further comprising instructions that when executed cause the system to:
  send the message request as a translated request to the PMU;
  return the pieces of data requested by the translated request to the performance monitoring driver, and
  send the pieces of data to a location specified in the message request.

11. The machine readable medium of claim 10, wherein sending the pieces of data to a location specified in the message request further includes sending the pieces of data at a time period specified in the message request.

12. The machine readable medium of claim 11, further comprising instructions that when executed cause the system to:
  generate a message that causes a fan internal to the host system to turn on in response to the pieces of data returned from the performance monitoring unit.

13. The machine readable medium of claim 9, further comprising instructions that when executed cause the system to:
  initiate a performance monitor application that generates a selection screen a display coupled to the I/O processor through the host processor,
  wherein selecting events within the I/O processor on which to gather data includes selecting the events on the selection screen.

14. The machine readable medium of claim 9, wherein sending the selected events as a message request to the real time operating system includes sending the message request through an operating system specific module of the host processor.

15. The machine readable medium of claim 9, wherein sending the translated request to the performance monitoring unit includes sending the translated request through the performance monitoring driver.

16. The machine readable medium of claim 9, wherein the set of private group parameters includes at least one of (i) control parameters for hardwared-based performance monitoring resources, (ii) mode-specific control parameters for a performance monitoring resource, and (iii) data parameters for at least one mode in one counter.

17. The machine readable medium of claim 16, wherein the set of private group parameters includes at least one of the following parameters: an adjusted sample, a control, a counter, a current mode, a current time, an ending time, an interval, a lock control, a maximum algorithm, a maximum mode, a minimum sample interval, a lock control, a maximum algorithm, a maximum mode, a minimum sample interval, a minimum sample unit, a mode control, a number counter, type of performance monitoring hardware available, a sample interval, a sigma time, and a status.

18. The machine readable medium of claim 9, further comprising instructions that when executed cause the system to:
  generate performance monitoring storage tables within memory of the I/O processor.

19. The machine readable medium of claim 18, further comprising instructions that when executed cause the system to:
  send the pieces of data to the performance monitoring storage tables.

20. A method comprising:
  sending requested data from a performance monitoring unit to a performance monitoring driver that is registered with a real time operating system (RTOS) on an input/output processor (IOP); and
  sending a message with the data from the RTOS to a host processor.

21. The method of claim 20, further comprising:
  subsequent to returning the data requested by the translated request to the performance monitoring driver, sending the data to the performance monitoring storage tables.

22. The method of claim 20, wherein sending the data to a location specified in the message request further includes sending the data at a time period specified in the message request.

23. The method of claim 22 further comprising:
  generating a message that causes a fan internal to the host system to turn on in response to the pieces of data returned from the performance monitoring unit.

24. A method according to claim 20 further comprising:
  returning data received in the message to a performance monitor application.

25. The method according to claim 20 wherein sending the message to the host processor includes sending the message through an operating system specific module.

26. The method according to claim 20 further comprising:
  generating performance monitoring storage tables within memory of the I/O processor.

27. An apparatus comprising:
  a performance monitoring unit (PMU);
  an I/O processor coupled to the PMU, the I/O processor to run a real-time operating system (RTOS)
  wherein the RTOS registers at least one performance monitoring driver;
  wherein the RTOS translates message requests into parameters.

28. An apparatus according to claim 27, wherein the RTOS sends a translation request to the performance monitoring driver.

29. An apparatus according to claim 27 further including:
  a storage device to store tables for collecting requested data.

30. A system comprising:
  a host processor;
  and input/output processor coupled to the host processor;
  the I/O processor to run a realtime operating system (RTOS), the RTOS to register a performance monitoring driver, and
  a performance monitoring circuit (PMU) coupled to the I/O processor.

31. The system of claim 30, wherein the host processor rums a performance monitoring application to request data from the PMU.

32. The system of claim 30, wherein the host processor runs an operating system specific module to send platform independent messages to I/O processor.

* * * * *

UNITED STATES PATENT AND TRADEMARK OFFICE
CERTIFICATE OF CORRECTION

PATENT NO. : 6,772,097 B1
DATED : August 3, 2004
INVENTOR(S) : Kromenaker et al.

It is certified that error appears in the above-identified patent and that said Letters Patent is hereby corrected as shown below:

Column 2,
Line 32, delete "into".

Column 17,
Line 25, after "screen", insert -- on --.

Column 18,
Line 49, delete "and" and insert -- an --.
Line 56, delete "rums" and insert -- runs --.

Signed and Sealed this

Twenty-first Day of December, 2004

JON W. DUDAS
*Director of the United States Patent and Trademark Office*